Oct. 21, 1958 A. A. WIDMANN 2,856,617
METHOD OF MAKING SELF-LOCKING VALVE LASH ADJUSTING SCREWS
Filed April 17, 1956 3 Sheets-Sheet 1
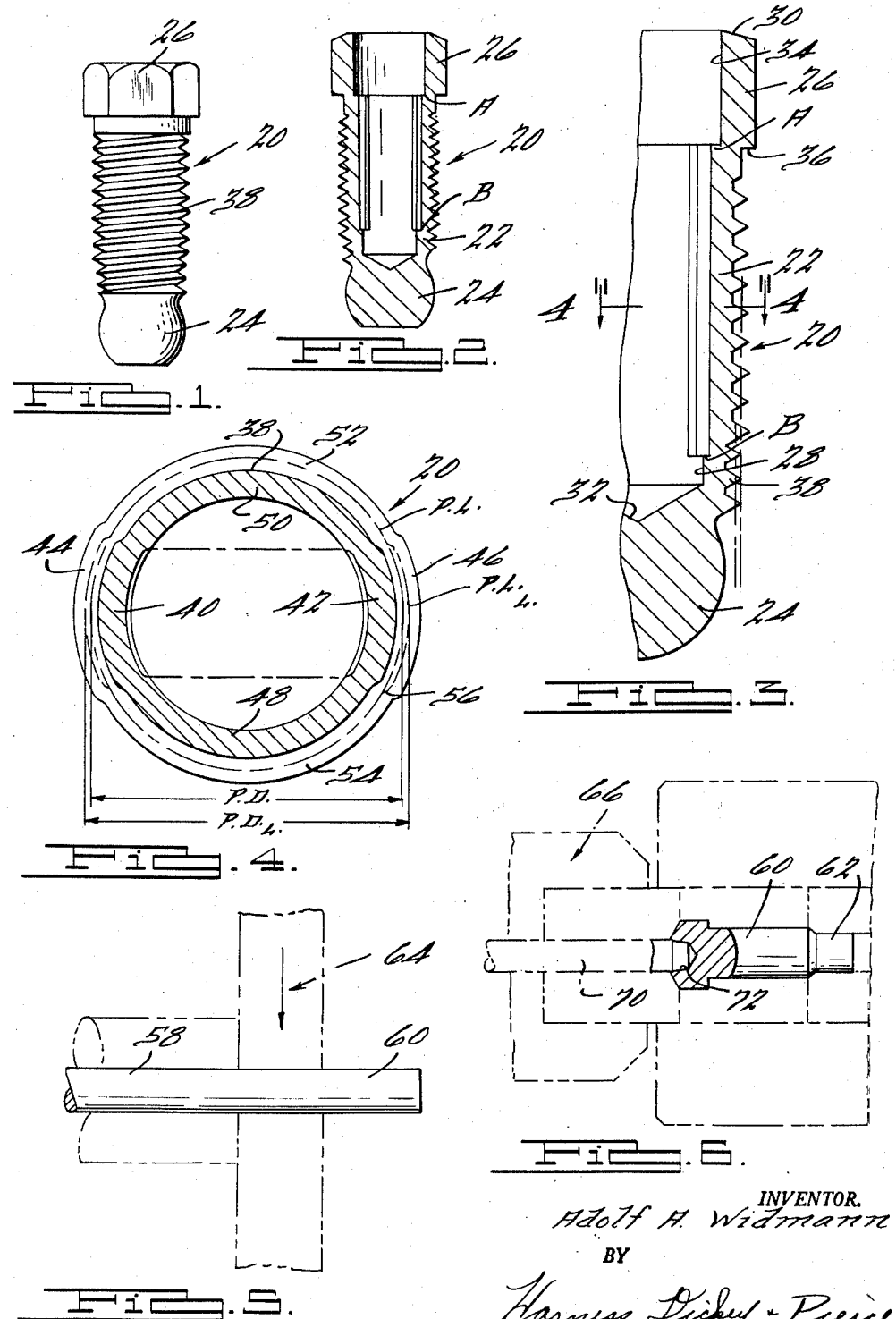
INVENTOR.
Adolf A. Widmann
BY
Harness, Dickey & Pierce
ATTORNEYS

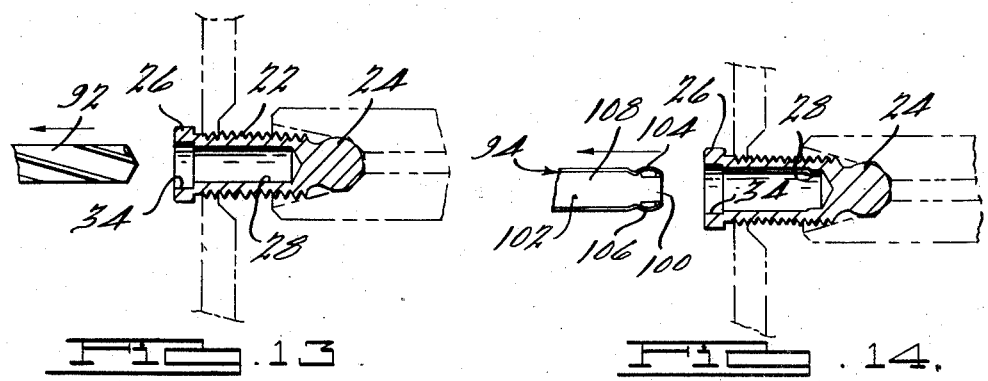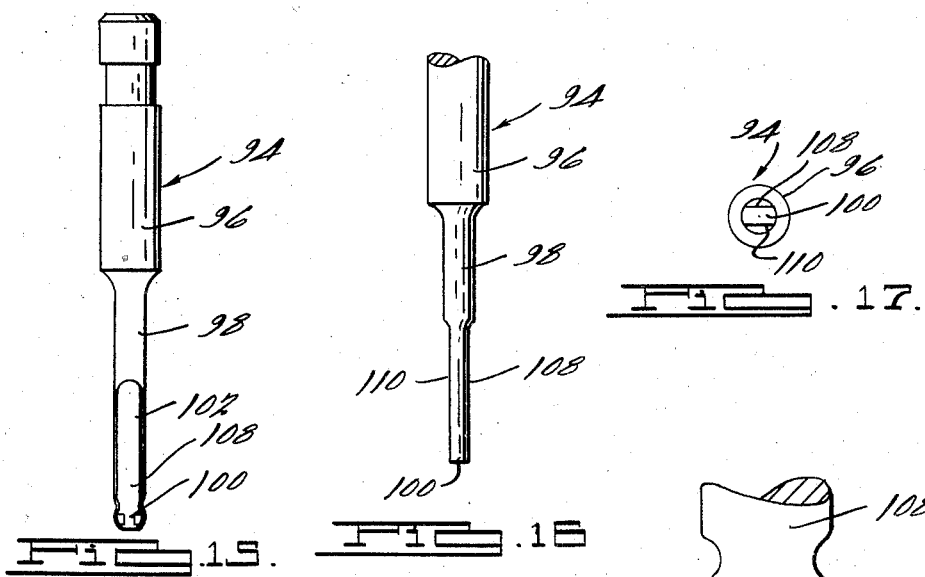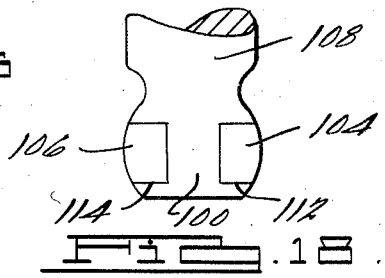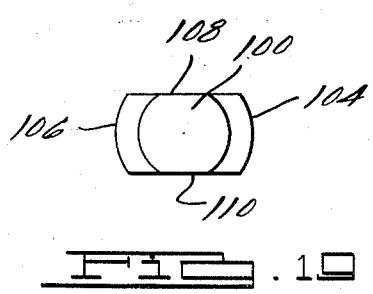

United States Patent Office 2,856,617
Patented Oct. 21, 1958

2,856,617

METHOD OF MAKING SELF-LOCKING VALVE LASH ADJUSTING SCREWS

Adolf A. Widmann, Grosse Pointe Farms, Mich., assignor to National Machine Products Company, Utica, Mich., a corporation of Michigan Application April 17, 1956, Serial No. 578,686

3 Claims. (Cl. 10—10)

This invention relates to a method of manufacturing valve lash adjusting screws and the like, and more particularly, to an improved method of making valve lash adjusting screws of the type disclosed in the applicant's co-pending application Serial Number 565,392 filed February 14, 1956, for Prevailing Torque Type Valve Lash Adjusting Screw. This application is a continuation in part of the applicant's co-pending application Serial Number 479,531 filed January 3, 1955, for Method of Making Self-Locking Valve Lash Adjusting Screws and now abandoned. The screws of the type in the applicant's aforementioned co-pending application Serial No. 565,392 include an elongate, substantially cylindrical body having an external thread thereon. A polygonal head and a ball or other bearing portion are also provided on the body, and a portion of the body projects abruptly radially outwardly for a major portion of its length to form a locking lobe. The screw is a prevailing torque type locking screw and may be locked in a mating internally threaded aperture in a rocker arm, tappet body, push rod or the like in any selected adjusted position.

The fabrication of such valve lash adjusting screws of the highest quality on a production basis and in a commercially economical manner involves numerous factors. The screw must be formed from workable metal stock requiring a minimum of fabrication; the metal must withstand deformation forces in a comparatively thin-walled section without cracking or weakening; the finished product must possess resiliency in the thin-walled portion of the screw; and the screw must be sufficiently rugged to withstand the relatively large forces to which valve lash adjusting screws are subjected in service.

An object of the present invention is to overcome disadvantages in prior methods of manufacturing valve lash adjusting screws and to provide an improved method of manufacturing a prevailing torque type valve lash adjusting screw which meets satisfactorily all the factors pointed out hereinabove.

Another object of the invention is to provide an improved method of manufacturing valve lash adjusting screws which enables the efficient production of high-quality prevailing torque type valve lash adjusting screws with a minimum of labor and expense.

Another object of the invention is to provide an improved method of manufacturing valve lash adjusting screws which reduces the amount of machining and the amount of scrap to a minimum.

The above as well as other objects and advantages of the present invention will become apparent from the following description, the appended claims and the accompanying drawings wherein:

Figure 1 is an elevational view of a valve lash adjusting screw manufactured in accordance with the method of the present invention;

Fig. 2 is a longitudinal sectional view of the screw illustrated in Fig. 1;

Fig. 3 is an enlarged longitudinal sectional view of a portion of the screw illustrated in Fig. 2;

Fig. 4 is a transverse sectional view of the screw illustrated in Fig. 3, taken on the line 4—4 thereof;

Fig. 5 is a schematic elevational view showing the shearing of round wire stock to form a blank or slug suitable for subsequent fabricating operations;

Figs. 6 and 7 illustrate two successive steps of upsetting the head, hex-finishing the head and forming a central cavity therein while at the same time extruding the other end of the blank to a smaller diameter;

Fig. 13 illustrates the step of accurately sizing the bore with a finish drill or reamer;

Fig. 14 illustrates the step of extruding the locking lobe portions of the screw;

Fig. 15 is a side elevational view of an extrusion tool which may be used in forming the locking lobe portions of the screw;

Fig. 16 is an end elevational view of the tool illustrated in Fig. 15;

Fig. 17 is an end view of the tool illustrated in Fig. 15;

Fig. 18 is an enlarged side elevational view of the head portion of the tool illustrated in Fig. 15; and Fig. 19 is an enlarged end view of the head portion of the tool illustrated in Fig. 15.

Figure 7:
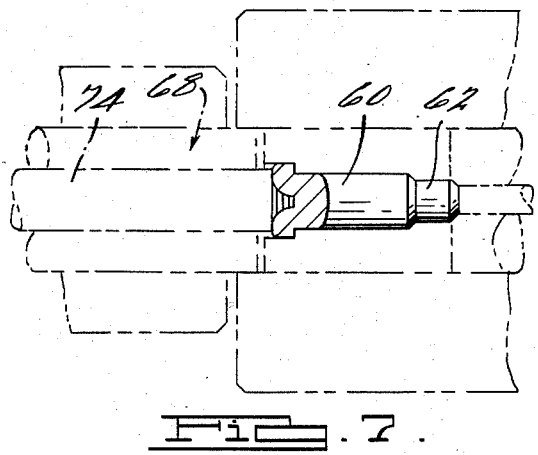
Figure 8:
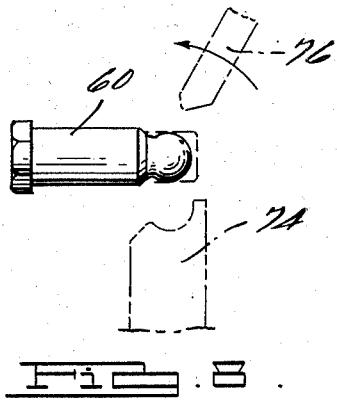
Fig. 8 illustrates the steps of rough machining with a formed tool and finish machining with a single point tool the ball or bearing end of the screw.

Referring to the drawings and, more particularly, to Figs. 1 through 4 thereof, a self-locking prevailing torque type valve lash adjusting screw generally designated 20 is illustrated which is of the type that may be manufactured in accordance with the method of the present invention. While the screw 20 is particularly adapted for use with a rocker arm, tappet body, push rod or other valve actuating member of an internal combustion engine, it will be understood that the screw 20 is applicable to other uses.

The screw 20 includes a body portion 22 which is preferably made from suitable steel stock, preferably steel which is low in sulfur and manganese content. It has been found, for example, that steel manufactured according to AISI–C–1017 or C–1020 specifications, both of which are low in sulfur and manganese content, are eminently satisfactory. A ball or bearing portion 24 is provided on one end of the body portion 22, the ball end portion 24 being integral with the body portion 22 and the maximum transverse dimension of the ball end portion being less than the root diameter of the body portion. The ball end portion 24 is adapted to bear against a push rod or other valve actuating member (not shown). An integral enlarged non-circular head portion 26 is provided on the end of the body portion 22 remote from the ball end portion 24, the maximum transverse dimension of the head portion 26 being substantially greater than the maximum transverse dimension of the body portion.

The screw 20 defines an axially extending bore 28 which is closed at one end and which extends from the end 30 of the screw through the head portion 26 and the body portion 22 to a position adjacent the ball end portion 24 thereof, the bottom wall 32 of the bore 28 being adjacent the inner end of the ball end portion 24, as shown in Figs. 2 and 3. The bore 28 is enlarged, as at 34, from the end 30 of the screw to a position adjacent the axially inner end 36 of the head portion 26 of the screw.

A conventional external thread 38 is initially provided on the body portion 22, the thread 38 extending continuously from a position adjacent the ball end portion 24 of the screw to a position adjacent the head portion 26 thereof. The thread 38 may be formed in any desired or conventional manner, as for example, by conventional thread rolling methods.

A pair of thread-locking lobe portions 40 and 42 are extruded from the wall of the body portion 22 of the screw on diametrically opposite sides of the longitudinal axis of the screw. The locking lobe portions 40 and 42 and the sections 44 and 46 of the thread 38 formed thereon project abruptly outwardly from the wall of the body portion 22 in a radial direction while the remaining portions 48 and 50 of the wall between the locking lobe portions 40 and 42 and the sections 52 and 54 of the thread formed on the body portion between the locking lobe portions 40 and 42 are substantially undistorted. The locking lobe portions 40 and 42 extend axially of the body portion 22 from a position adjacent the inner end 36 of the head portion 26 of the screw to a position near, but spaced from, the ball end portion 24 of the screw. It is preferred that the two or three leading convolutions of the thread 38 adjacent the ball end portion 24 retain the original pitch diameter so that such leading convolutions will easily enter the internally threaded aperture of a mating member, such as a rocker arm. As shown in Figs. 1, 2 and 3, the locking lobe portions 40 and 42 extend longitudinally of the body portion 22 of the screw for substantially the entire length thereof, as for example, from the point A to the point B thereby affording a wide range of self-locking adjustment positions of the screw relative to the mating member. As shown in Fig. 4, the pitch diameter P. D.$_L$ of the sections 44 and 46 of the thread on the locking lobe portions 40 and 42 is greater than the pitch diameter P. D. of the remaining sections of the originally rolled thread between the locking lobe portions. Furthermore, the pitch diameter of the sections 44 and 46 of the thread on the locking lobe portions is uniform throughout the length of the locking lobe portions, as shown in Figs. 1, 2 and 3 and, as shown in Fig. 4, the pitch line P. L.$_L$ of the sections 44 and 46 of the thread on the locking lobe portions defines a segment of a right circular cylinder which is concentric with respect to and greater in diameter than the cylinder defined by the pitch line P. L. of the initially rolled thread. It will be understood of course that the pitch diameter of the sections of the thread on the locking lobe portions and the pitch diameter of the undistorted sections changes abruptly, as at 56, since the locking lobe portions 40 and 42 preferably have a small fillet radius which is formed during the extruding operation. Thus the sections 52 and 54 of the thread 38 between the locking lobe portions 40 and 42 retain substantially the original pitch diameter and are substantially undistorted, and the sections 52 and 54 of the thread betwen the locking lobe portions preferably have a clearance fit in the internally threaded aperture of the mating member.

In general, in manufacturing valve lash adjusting screws in accordance with the present invention, the basic stock selected may, for example, be a round wire or rod 58. As previously mentioned, it is preferred to use a steel stock having a low sulfur and manganese content in order to avoid cracking or rupturing of the metal during the manufacture of the screw and to avoid cracking or rupturing when the screw is in use. A blank 60 is sheared from the basic stock 58 and the blank 60 is upset to form the head portion 26 of the screw. At the same time, the opposite end portion 62 of the blank 60 may be extruded to a smaller diameter. The smaller diameter end portion 62 is then machined to form the bearing portion 24 of the screw, and the external thread 38 is then formed on the body portion of the screw. The head end portion of the blank is then drilled to form the enlarged portion 34 of the bore 28 after which the bore 28 is formed and accurately sized in the body portion of the screw. Thereafter diametrically opposite portions of the wall of the body inwardly of the leading end of the thread are extruded radially outwardly for the major portion of its length to form the locking lobe portions. The screw is then hardened as by carburizing to a spring temper and the bearing portion is selectively hardened.

As shown in Fig. 5, in manufacturing the screws in accordance with the present invention, conventional shearing apparatus 64 may be used to shear a blank 60 from the stock 58. The blank 60 is then positioned in the first forming station, as shown in Fig. 6, where the head portion 26 of the screw is initially formed to a preliminary shape by upsetting one end of the blank 60 after which an additional upsetting operation is performed, as shown in Fig. 7, to finish the exterior of the hex head portion 26 to the desired shape and size. During the upsetting operations, the opposite end portion 62 of the blank is extruded to a smaller diameter, as previously mentioned. The extrusion of the end portion 62 of the blank 60 to a smaller diameter results in a saving of material, time and tool wear when the ball end portion 24 is subsequently formed by machining the reduced diameter portion. Conventional header apparatus 66 and 68 with the desired tooling is utilized to perform the upsetting operations as indicated in Figs. 6 and 7.

As shown in Fig. 6, a punch 70 which is axially aligned with the blank 60 during the upsetting operation aids in shaping the head portion to rough form and at the same time forms a central cavity or recess 72 in the head. As shown in Fig. 7, another punch 74 further displaces the metal of the head and aids in shaping the hex head to its finished form where the flats and corners are sharply defined. During the second upsetting operation, the central cavity 72 is maintained although of a slightly different shape and such cavity serves as a guide for the subsequent drilling operation. This central cavity assures guidance of the drills so as to maintain uniform wall thickness of the body in the drilling operations hereinafter described.

Following the steps illustrated in Figs. 5 through 7, the reduced diameter end portion 62 of the blank 60 is machined with a forming tool 74 to roughly form the ball or bearing end portion 24 which is thereafter finished with a single point tool 76 that revolves about the axis of the ball end portion.

Figure 9:
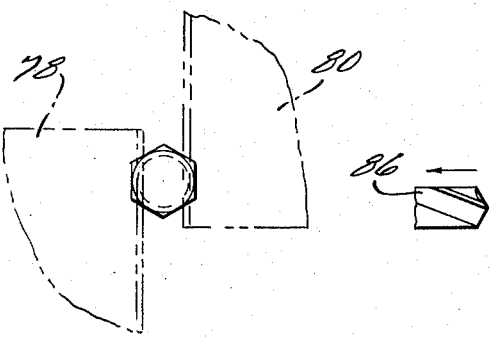
Fig. 9 illustrates the thread forming operation.

After the ball end portion 24 has been formed, the thread 38 is formed on the body portion 22 of the screw by conventional thread rolling dies 78 and 80 as shown in Fig. 9.

After the thread 38 has been formed on the body portion 22, the screw is clamped in a stationary position against an anvil 82 by suitable spring loaded jaws 84 whereupon the screw subjected to the drilling operations illustrated in Figs. 10 through 13 so as to form the longitudinal bore 28 centrally of the body portion of the screw. As previously mentioned, the bore 28 terminates in the body portion at a position near, but spaced from, the bearing or ball end portion 24 thereof and at a point adjacent the leading end of the thread.

Figure 10:
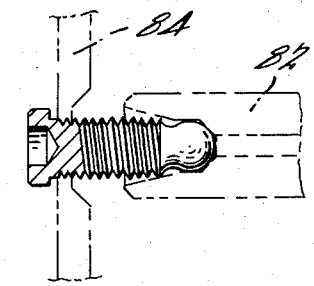
Fig. 10 illustrates the step of drilling a clearance passageway in the head portion of the blank.
Figure 12:
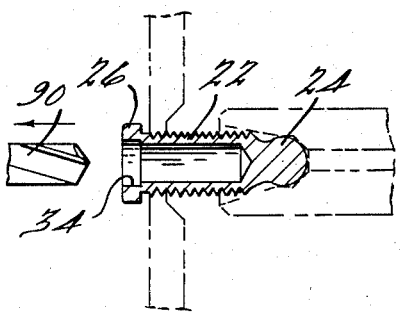
Figs. 11 and 12 illustrate the steps of drilling the bore in the body portion to the proper depth in multiple steps.

A drill 86 of proper size is then caused to enter the head end of the screw coincident with the central cavity 72 previously formed therein and the drill 86 penetrates the head portion of the screw to an extent generally indicated in Fig. 10 so as to form the enlarged portion 34 of the bore 28, the enlarged portion 34 being slightly greater in diameter than the remaining portion of the bore 28 to be formed in the body portion of the screw, so as to permit the extrusion tool, hereinafter described, to pass freely through the head portion of the screw without distorting the head portion and into the bore of smaller diameter to effect the extrusion of the locking lobe portions. The drill 86 is then withdrawn.

It has been found that production speeds may be maintained and economies effected if the drilling is performed in multiple stages or steps. This manner of operation insures maintaining the drills at a cool temperature and to a certain extent avoids the interruption of the drilling operations due to overheating or breaking of the drills.

Figure 11:
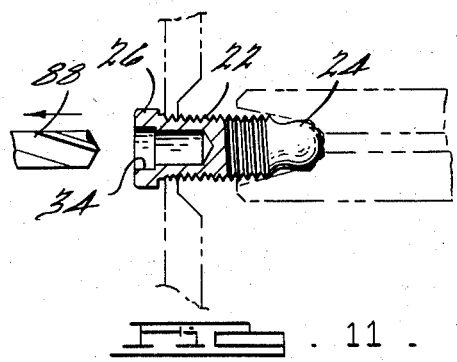

Referring to Fig. 11, a drill 88 of somewhat smaller size than that employed to form the enlarged portion 34 of the bore is then caused to enter axially of the opening in the head portion so as to drill the body portion of the screw to the extent generally indicated in Fig. 11 whereupon the drill 88 is withdrawn. Thereafter, another and preferably cool drill 90 of the same size as the drill 88 is caused to enter the body portion for the purpose of extending or deepening the bore therein to the extent generally indicated in Fig. 12 following which the drill 90 is withdrawn. The bore 28 is then finish drilled or reamed by a finishing drill or reamer 92, as desired, to the final desired dimensions of the bore and to remove any roughness in the wall thereof as indicated in Fig. 13 after which the finishing drill or reamer 92 is withdrawn.

Referring to Figs. 14 through 19, a tool 94 is illustrated which may be utilized to form the locking lobe portions 40 and 42 on the body portion 22 of the screw. The tool 94 includes a shank portion 96, a neck portion 98 and a head portion 100, the shank portion 96 being adapted to be inserted in the tool holding member of a driving machine (not illustrated) while the head portion 100 and the adjacent section 102 of the neck portion 98 are adapted to be driven into the previously formed bore 28 in the body portion of the screw. The head portion 100 of the tool 94 includes curved surfaces 104 and 106, the center of curvature of which coincides with the longitudinal axis of the bore 28 when the tool is inserted therein and the radius of curvature of which is preferably substantially the same or slightly less than the radius of curvature of the enlarged portion 34 of the bore 28 of the screw. The radius of curvature of the surfaces 104 and 106 is greater than the radius of curvature of the bore 28 of the screw. The head portion 100 and the adjacent section 102 of the neck portion 98 are also provided with flat substantially parallel side walls 108 and 110, the perpendicular distance between the side walls 108 and 110 being substantially less than the minimum transverse dimension of the bore 28. If desired, carbide inserts 112 and 114 may be brazed to the head portion 100 of the tool, the inserts 112 and 114 serving to provide the curved surfaces 104 and 106 and prolonging the life of the tool.

In extruding the locking lobe portions 40 and 42 through the wall of the body portion 22 of the screw, the head portion 100 and the adjacent section 102 of the neck portion 98 of the tool 94 are forced into the bore 28 of the screw so as to extrude diametrically opposed sections of the wall of the body portion of the screw radially outwardly for substantially the entire length of the body portion. As previously mentioned, it is preferred that the locking lobe portions 40 and 42 terminate in spaced relationship with respect to the ball end portion 24 so that several convolutions of the thread 38 at the leading end of the screw retain the initial pitch diameter to facilitate the starting engagement with a complementary internal thread in the rocker arm, tappet body, push rod or the like. Since the maximum transverse dimension of the head portion 100 and the adjacent section 102 of the neck portion 98 of the tool is substantially the same or less than the diameter of the enlarged portion 34 of the bore 28, the wall of the head portion 26 of the screw is not affected by the tool and the head portion 26 retains its original configuration when the tool 94 is driven into the bore of the screw, as shown in Fig. 14.

The enlarged head portion 26 of the screw and the closed ball end portion 24 of the screw cooperate to support and maintain the rigidity of the wall of the body portion 22 during the lobe forming operation so that the metal is extruded or displaced rather than merely deformed, and the portions of the wall intermediate the lobe portions remain substantially undistorted. The diameter of the bore 28 is preferably initially proportioned to the outside diameter of the screw so that the wall of the body portion remains relatively stiff when the bore 28 is formed in the screw. In the embodiment of the invention illustrated, the diameter of the bore 28 is approximately 75% of the outside diameter of the body portion.

The prevailing torque may be predetermined and may be varied by varying the ratio of the outside diameter of the screw body portion 22 to the diameter of the bore 28 so as to vary the flexibility of the wall of the body portion. For example, if the screw is to be used with a mating internally threaded member having a relatively loose tolerance, the diameter of the bore 28 of the screw may be increased slightly to increase the flexibility and the spring effect of the wall of the body portion. If the screw is to be used with mating threads of, for example, aircraft tolerances, the diameter of the bore 28 may be reduced slightly to reduce the flexibility and the spring effect of the wall of the body portion. Since the head portion 100 of the tool 94 enters and is forced into the screw axially of the bore, and since the wall of the body portion is parallel to the longitudinal axis of the screw, the locking lobe portions 40 and 42 project uniformly radially outwardly and also extend longitudinally of the body portion of the screw for a distance substantially coincident with the distance which the head 100 of the tool penetrates within the bore. This results in a uniform displacement of the thread on the locking lobe portions while the several convolutions at the leading end of the thread retain the initial pitch diameter.

Each of the locking lobe portions 40 and 42 may subtend an angle ranging between five and one-hundred fifty degrees, and preferably subtends an angle in the range of fifteen to ninety degrees. In the screw illustrated, each of the locking lobe portions 40 and 42 subtends an angle of approximately thirty degrees. With such a construction, a substantial area of contact is effected between the sections 44 and 46 of the thread on the locking lobe portions 40 and 42 and the mating internal threads, and such area contact also extends for substantially the entire length of the internal threads when the screw projects through the bore of a rocker arm. The uniform displacement of the sections of the thread on the locking lobe portions insures a uniform prevailing torque throughout the range of adjustment of the screw, and a definite and positive prevailing torque is obtained throughout this range.

After the locking lobe portions have been formed on the screw, the screw is preferably hardened to spring temper, as by carburizing, and the ball end portion 24 is preferably selectively induction hardened, to a hardness corresponding to 58 on the Rockwell C scale.

From the above description, it will be apparent that the screw 20 may be readily started into an internally threaded aperture in a rocker arm since the entering convolutions of the thread have a free fit. As the locking lobe portions enter the mating internally threaded aperture, an interference fit is effected and the locking lobe portions 40 and 42 are subjected to compression forces which cause the lobe portions to yield elastically and resiliently radially inwardly. The dimensional amount of elastic compression to which the lobe portions are subjected is absorbed by the thread clearance portions disposed between the locking lobe portions. The result is a lasting and enduring lock between the segments of the thread flanks on the locking lobe portions and the thread flanks of the internal thread. Consequently, the screw is self-locking and a prevailing torque is obtained in any position of adjustment in the mating internally threaded aperture.

What is claimed is:

1. The method of forming a self-locking screw which includes the steps of upsetting a blank to form a substantially cylindrical elongated shank and a polygonal wrench engageable head at one end of said shank, forming a bearing surface of substantial area at the opposite end of said shank, forming a continuous external thread on the shank of said blank, forming a bore of substantial diameter in said blank extending through the head and for the major portion of the length of said shank and terminating in spaced relationship with respect to said bearing surface with the diameter of the bore in said head being greater than the diameter of the bore of said shank so as to permit an extrusion tool to be axially inserted in the bore and axially passed through said head without substantially distorting said head, and axially introducing an extrusion tool into the bore so as to radially outwardly extrude a plurality of arcuately spaced sections of said threaded shank from within the bore during axial movement of the tool to form locking lobes extending for the major portion of the length of said thread with the pitch line of the thread on the locking lobes lying on a cylinder concentric with the screw axis and of a diameter greater than the pitch diameter of the remaining portions of the thread while maintaining the portions of the thread intermediate the locking lobe portions substantially undistorted.

2. The method as set forth in claim 1 including the step of limiting the axial movement of the extrusion tool so that at least one convolution of the thread at the leading end thereof is maintained substantially undistorted.

3. The method as set forth in claim 2 and including the steps of hardening the screw to spring temper and thereafter selectively induction hardening the bearing surface.

References Cited in the file of this patent
UNITED STATES PATENTS

| | | |
|---|---|---|
| 1,041,203 | Vahle | Oct. 15, 1912 |
| 1,805,384 | Vis | May 12, 1931 |
| 1,832,167 | Wilcox | Nov. 17, 1931 |
| 1,874,657 | Trotter | Aug. 30, 1932 |
| 1,957,784 | Johnson | May 8, 1934 |
| 2,036,551 | Stevens | Apr. 7, 1936 |
| 2,086,801 | Hayden | July 13, 1937 |
| 2,302,621 | Luboshez | Nov. 17, 1942 |
| 2,637,361 | Nagel | May 5, 1953 |